(12) United States Patent
McIver, Jr. et al.

(10) Patent No.: US 9,913,039 B2
(45) Date of Patent: Mar. 6, 2018

(54) AUDIO ADAPTOR AND METHOD

(71) Applicant: NEW BRUNSWICK COMMUNITY COLLEGE, Fredericton (CA)

(72) Inventors: William J. McIver, Jr., Fredericton (CA); Jonathan Daigle, Fredericton (CA); Noah Hay, Fredericton (CA); Denis Thomas Leger, Moncton (CA); Jakob Skodje, St. George (CA); Dennis Metcalfe, Haute-Aboujagane (CA)

(73) Assignee: New Brunswick Community College, Fredericton (CA)

(*) Notice: Subject to any disclaimer, the term of this patent is extended or adjusted under 35 U.S.C. 154(b) by 0 days.

(21) Appl. No.: 15/624,939

(22) Filed: Jun. 16, 2017

(65) Prior Publication Data
US 2017/0289688 A1 Oct. 5, 2017

Related U.S. Application Data

(63) Continuation-in-part of application No. 14/953,170, filed on Nov. 27, 2015, now Pat. No. 9,699,564.

(60) Provisional application No. 62/191,739, filed on Jul. 13, 2015.

(51) Int. Cl.
*H04R 5/04* (2006.01)
*G10L 15/26* (2006.01)
*H04M 1/02* (2006.01)

(52) U.S. Cl.
CPC ............. *H04R 5/04* (2013.01); *G10L 15/265* (2013.01); *H04M 1/0258* (2013.01); *H04R 2420/09* (2013.01)

(58) Field of Classification Search
None
See application file for complete search history.

(56) References Cited

U.S. PATENT DOCUMENTS

| | | | | |
|---|---|---|---|---|
| 5,253,285 A | * | 10/1993 | Alheim | G09B 21/009 340/4.13 |
| 5,991,723 A | * | 11/1999 | Duffin | H04M 1/2475 379/52 |
| 5,995,590 A | * | 11/1999 | Brunet | H04M 1/2475 340/4.13 |
| 6,546,082 B1 | * | 4/2003 | Alcendor | H04Q 3/0029 379/52 |
| 8,996,376 B2 | * | 3/2015 | Fleizach | G10L 13/043 365/232 |
| 2003/0072420 A1 | * | 4/2003 | Feigenbaum | G09B 21/00 379/52 |

(Continued)

*Primary Examiner* — Paul Huber
(74) *Attorney, Agent, or Firm* — Perry + Currier Inc.

(57) ABSTRACT

An audio adaptor and method of communication is provided. The audio adaptor includes a first connector for connecting to a source of audio, a second connector for connecting to a telephone, a third connector for connecting to an audio output device, and a microcontroller. The method involves receiving a first audio signal at a line level from the source of audio, receiving a second audio signal at the line level from a telephone, transmitting the first audio signal and the second audio signal at the line level to an audio output device, attenuating the first audio signal from the line level to a microphone level and transmitting the attenuated first audio signal.

20 Claims, 11 Drawing Sheets

(56) References Cited

U.S. PATENT DOCUMENTS

| | | | |
|---|---|---|---|
| 2004/0028191 A1* | 2/2004 | Engelke | G10L 15/26 379/52 |
| 2005/0025290 A1* | 2/2005 | Doherty | G09B 21/009 379/52 |
| 2006/0009975 A1* | 1/2006 | Schrocter | G10L 13/047 704/258 |
| 2006/0106602 A1* | 5/2006 | Caldwell | H04M 1/2475 704/235 |
| 2009/0012793 A1* | 1/2009 | Dao | G10L 13/00 704/260 |
| 2010/0128900 A1* | 5/2010 | Johnson | H03G 3/001 381/98 |
| 2016/0035343 A1* | 2/2016 | Tang | G10L 13/00 704/260 |

\* cited by examiner

AUDIO ADAPTOR AND METHOD

CROSS-REFERENCE TO RELATED APPLICATION

This application is a continuation-in-part of U.S. patent application Ser. No. 14/953,170 filed Nov. 27, 2015 which claims the benefit of U.S. Provisional Patent Application 62/191,739, filed Jul. 13, 2015, the entire contents of which are incorporated herein by reference.

FIELD

The present specification relates generally to audio adaptors and more specifically relates to audio adaptors connectable to a telephone.

BACKGROUND

People who have impairments that affect their ability to speak have access to assistive text-to-speech devices. More recently, generic tablet computers can now use various applications to emulate a text-to-speech device. Such devices enable the person with a speech impairment to enter text in various ways and then have the text converted into speech. Text-to-speech devices are quite useful for face-to-face conversations; however, telephone conversations present a challenge. For example, in order for a person to listen to a remote party of the phone conversation and use the text-to-speech device, the text-to-speech device and phone would need to be positioned close to each other. This generally requires the use of at least one hand leaving only one other hand available to operate the text-to-speech device. Alternatively, the telephone can be operated in speaker mode to free both hands; however, this is not practical in some situations, such as when privacy is desired or in noisy environments.

SUMMARY

In accordance with an aspect of the invention, there is provided an audio adaptor. The audio adaptor includes a first connector for connecting to a source of audio. The first connector is configured to receive a first audio signal at a line level from the source of audio. The audio adaptor also includes a second connector for connecting to a telephone. The second connector is configured to receive, from the telephone, a second audio signal at the line level from the telephone. The second connector is further configured to transmit, to the telephone, the first audio signal at a microphone level. The audio adaptor further includes a third connector for connecting to an audio output device. The third connector is configured to transmit the first audio signal and the second audio signal at the line level to the audio output device. Furthermore, the audio adaptor includes an attenuator connected to the first connector and the second connector. The attenuator is for attenuating the first audio signal from the line level to the microphone level.

The attenuator may include a voltage reducer to reduce a voltage of the first audio signal.

The audio adaptor may further include a mixer in communication with the first connector, the second connector and the third connector. The mixer may be configured to combine the first audio signal received from the first connector and the second audio signal received from the second connector to generate a combined audio signal for output to the third connector.

The audio adaptor may further include an amplifier configured to amplify the combined audio signal.

The third connector may be configured to connect to headphones.

The third connector may be configured to provide stereo output to the headphones.

A first channel of the stereo output may be configured to output the first audio signal and a second channel of the stereo output is configured to output the second audio signal.

The second connector may be a four-conductor connector.

The first connector may be configured to connect to a text-to-speech device.

The text-to-speech device may be a tablet computer.

The audio adaptor may include a digital-signal processor for receiving a digital signal from the first connector.

In accordance with another aspect of the invention, there is provided a method of communication. The method involves receiving a first audio signal at a line level from the source of audio via a first connector connected to the source of audio. The method also involves receiving a second audio signal at the line level from a telephone via a second connector connected to the telephone. The method further involves transmitting the first audio signal and the second audio signal at the line level to an audio output device via a third connector. In addition, the method involves attenuating the first audio signal from the line level to a microphone level using an attenuator connected to the first connector and the second connector. Furthermore, the method involves transmitting the first audio signal at the microphone level to the telephone.

Attenuating may involve reducing a voltage of the first audio signal.

The method may further involve combining the first audio signal received from the first connector and the second audio signal received from the second connector to generate a combined audio signal for output to the third connector.

The method may further involve amplifying the combined audio signal.

The method may further involve connecting the third connector to headphones.

The method may further involve providing stereo output to the headphones.

Transmitting the first audio signal and the second audio signal may involve outputting the first audio signal to a first channel of the stereo output and outputting the second audio signal to a second channel of the stereo output.

The method may further involve connecting the first connector to a text-to-speech device.

Receiving the first audio signal may involve receiving a digital signal.

BRIEF DESCRIPTION OF THE DRAWINGS

Reference will now be made, by way of example only, to the accompanying drawings in which.

DETAILED DESCRIPTION OF THE EMBODIMENTS

Figure 1:
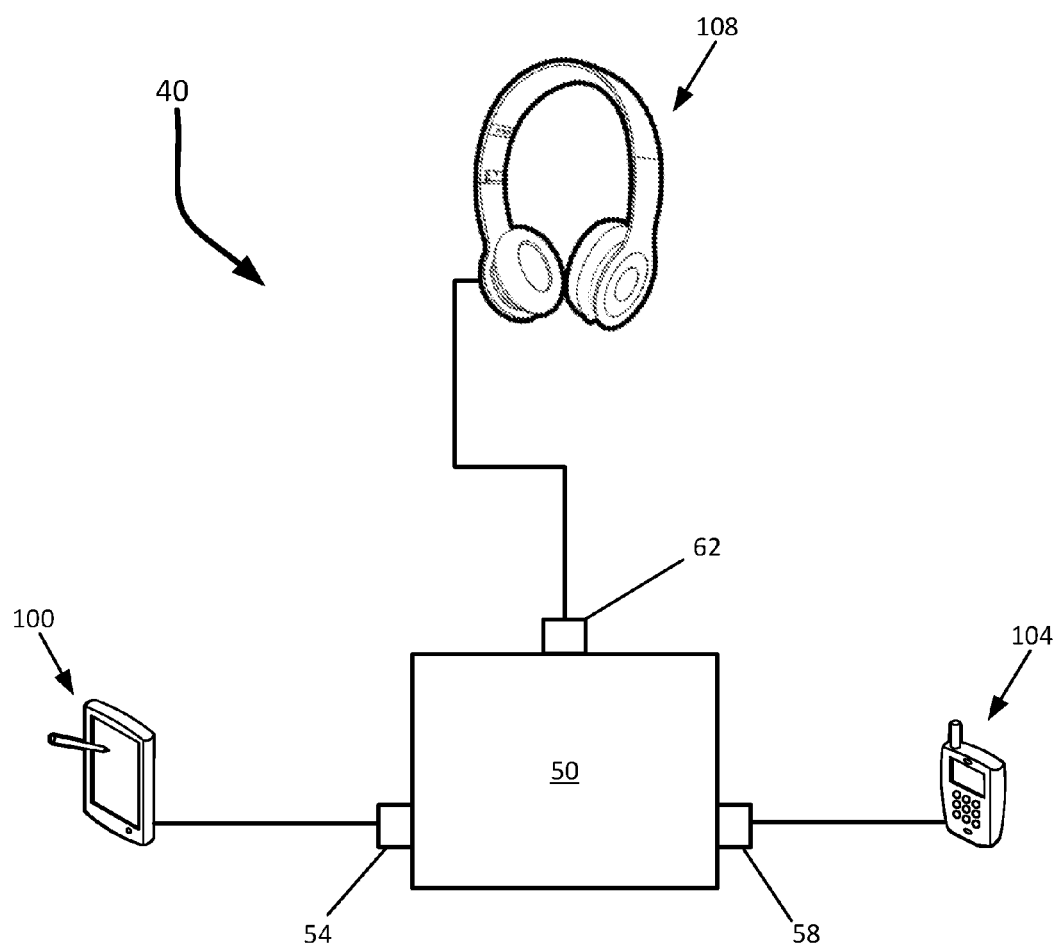
FIG. 1 is a schematic representation of a communication system in accordance with an embodiment.

Referring to FIG. 1, a schematic representation of a communication system for a person with a speech impairment is generally shown at 40. It is to be understood that the communication system 40 is purely exemplary and it will be apparent to those skilled in the art that a variety of communication systems are contemplated. The communication system 40 includes an audio adaptor 50, a text-to-speech device 100, a telephone 104, and an audio output device 108. The audio adaptor 50 includes a plurality of connectors 54, 58, and 62 for connecting the text-to-speech device 100, the telephone 104, and the audio output device 108, respectively. The person with a speech impairment can use the telephone 104 to establish a communication link with a remote party. After establishing the link, the person with a speech impairment can use the text-to-speech device 100 to provide input for communicating to the remote party via the audio adaptor 50. Audio output received from the remote party via the telephone 104 and audio output based on the input received at the text-to-speech device 100 is directed by the audio adaptor 50 to the audio output device 108.

The text-to-speech device 100 is generally configured to convert text input to speech audio output. It is to be appreciated that, in general, the text-to-speech device 100 includes a processor for executing programming instructions in the form of codes stored on a computer readable medium. In the present embodiment, the text-to-speech device 100 is configured to receive input from a touch screen or physical keyboard representing text. The processor subsequently converts the text input into audio output. The audio output can be subsequently converted into sounds using a speaker at the text-to-speech device 100 and/or into audio signals for transmission from an output port. In the present embodiment, the text-to-speech device 100 converts text to an audio signal at a line level for output from a 3.5 mm socket. It is to be appreciated by a person of skill in the art with the benefit of this description that the level of output and the type of connector is not particularly limited. For example, the audio signal can be generated at higher or lower levels than the typical line level for consumer audio devices. The 3.5 mm socket can also be substituted with another suitable connector such as a 2.5 mm socket, a 6.35 mm socket or any other type of connector capable of transmitting an audio signal. It is also to be appreciated that the text-to-speech device 100 is not particularly limited. For example, the text-to-speech device 100 can be a dedicated machine specifically designed for a person with a speech impairment. As another example, the text-to-speech device 100 can be a general computing device, such as any one of a personal computer, a laptop computer, a portable electronic device, a gaming device, a mobile computing device, a portable computing device, a tablet computing device, a personal digital assistant, a cell phone, a smartphone or the like, having an application configured to perform the function of converting text input to speech output.

The telephone 104 is generally configured to establish a communication link with a remote party for engaging in a voice communication session. It is to be appreciated by a person of skill in the art with the benefit of this description that the telephone 104 is not particularly limited and can be modified to include any type of voice communication device. For example, the telephone 104 can be a conventional telephone, a cellular telephone, a smartphone, or a computing device connected to a plain old telephone service (POTS). Alternatively, the telephone 104 can be a computing device capable of VoIP communication or a radio device. In the present embodiment, the telephone 104 is generally configured to receive audio input and provide audio output using a 3.5 mm socket capable of connecting to a TRRS connector (i.e. a four-conductor connector). The telephone 104 is configured to receive the audio input at a microphone level and provide the audio output at a line level. It is to be appreciated by a person of skill in the art with the benefit of this description that the level of output and input is not particularly limited. For example, the audio signal of the output can be generated at higher or lower levels than the typical line level for consumer audio devices. Similarly, the telephone 104 can be configured to receive audio signals at higher or lower levels than the typical microphone level. In addition, the type of connector for receiving input and providing output at the telephone 104 is not particularly limited. The 3.5 mm socket can be substituted with another suitable connector such as a 2.5 mm socket, a 6.35 mm socket or any other type of connector capable of transmitting and receiving audio signals. Another example of a substitution can include using a TRS connector (i.e. a three-conductor connector) to transmit audio signals to the audio adaptor and an additional connector (not shown) for receiving audio signals from the audio adaptor 50. Furthermore, the connector 58 capable of transmitting and receiving an audio signal can be separated into two or more connectors, such as at least one for transmitting and at least another for receiving audio signals.

The audio output device 108 is generally configured to provide audio output based on an audio signal. It is to be appreciated by a person of skill in the art with the benefit of this description that the audio output device 108 is not particularly limited and can be modified to include any device capable of providing audio output. For example, the audio output device can be a headphone, earbuds, or a speaker system. In the present embodiment, the audio output device 108 is a pair of headphones capable of providing stereophonic audio output privately to the person with a speech impairment. However, in other embodiments, the audio output device 108 can be modified to provide monophonic audio to a single ear or to both ears of the person with a speech impairment.

Figure 2:
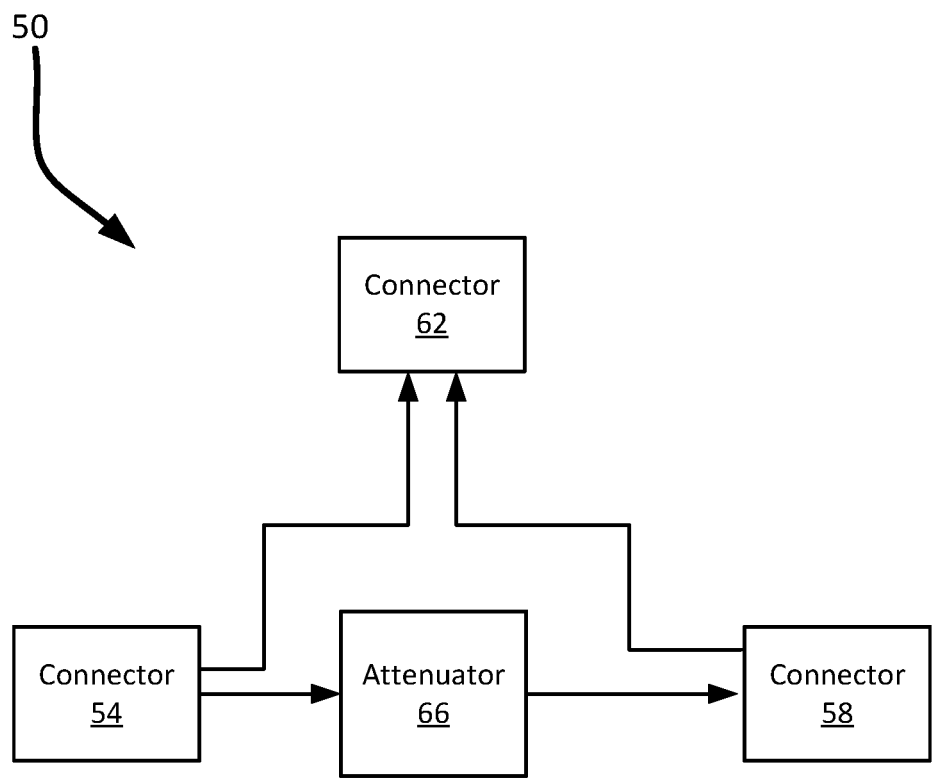
FIG. 2 is a schematic representation of an audio adaptor in accordance with the embodiment shown in FIG. 1.

Referring to FIG. 2, a schematic block diagram of showing various components of the audio adaptor 50 is illustrated. It is to be understood that the audio adaptor 50 is purely exemplary and it will be apparent to those skilled in the art that a variety of audio adaptors are contemplated including other embodiments discussed in greater detail below. The audio adaptor 50 includes the plurality of connectors 54, 58, and 62, and an attenuator 66 in connection with at least the connectors 54 and 58.

The connector 54 is generally configured to connect to a source of audio and receive an audio signal. In the present embodiment, the connector 54 is configured to connect to the text-to-speech device 100 and receive an audio signal at a line level typical of general consumer devices. In particular, the connector 54 can be a 3.5 mm socket configured to receive a 3.5 mm plug for receiving audio signals at the line level having nominal values of about 0 dBV (1.000 volt). It is to be appreciated that in other embodiments, the connector can be a professional XLR connector.

The connector 58 is generally configured to connect to a communication device for communicating with a remote party. In the present embodiment, the connector 58 is configured to connect to the telephone 104 and to transmit and receive audio signals from an audio communication session. In particular, the connector 58 can be a 3.5 mm socket configured to receive a 3.5 mm TRRS connector plug configured to transmit an audio signal to the telephone 104 at a microphone level having nominal values of about −60 dBV (0.001 volt) to −40 dBV (0.010 volt). However, it is to be appreciated by a person of skill with the benefit of this description that variations of the microphone level are possible.

In the present embodiment, the connector 58 is also configured to receive an audio signal at the line level from the telephone 104 having nominal values of about 0 dBV (1.000 volt). It is to be appreciated that variations of the connector 58 are contemplated. For example, instead of using a single TRRS connector, the connector 58 can be modified to include two separate sockets or lines, where one line is configured to transmit an audio signal to the telephone 104 and the other line is configured to receive an audio signal from the telephone 104. As another example, the connector 58 can be modified to accommodate a TRRS connector plug (i.e. a four-conductor connector) to receive stereophonic audio signals from the telephone 104.

The connector 62 is generally configured to connect to the audio output device 108. The connector 62 is in communication with both the connector 54 and the connector 58. In the present embodiment, the connector 62 is configured to transmit the audio signals received at the connectors 54 and 58 and to direct the audio signals to the audio output device 108. In the present embodiment, the audio signals received at the connectors 54 and 58 from the text-to-speech device 100 and the telephone 104, respectively, are directly passed through to the connector 62 without any processing. Accordingly, the audio signals from the connectors 54 and 58 are transmitted to the audio output device 108 in two separate channels from the connector 62 in the present embodiment. It is to be appreciated with the benefit of this description that since the audio signals from the connectors 54 and 58 are received at the line level in the present embodiment, the transmitted audio signals from the connector 62 to the audio output device 108 is also at the line level.

The attenuator 66 is in communication with both the connector 54 and the connector 58. The attenuator is generally configured to receive an audio signal from the connector 54, attenuate the signal and provide the attenuated signal to the connector 58 for transmitting to the telephone 104. In the present embodiment, the attenuator is configured to attenuate the signal received from the text-to-speech device 100 at the line level to a microphone level for transmitting to the telephone 104. The manner by which the audio signal is attenuated is not particularly limited and the attenuator 66 can be a simple voltage reducer, such as a resistor, for reducing the overall voltage of an audio signal. In the present embodiment, line level having nominal values of about 0 dBV (1.000 volt) is attenuated to microphone level having nominal values of −60 dBV (0.001 volt) to −40 dBV (0.010 volt). It is to be appreciated that the signal strength of the audio signal at the connector 54 and the connector 58 is not particularly limited. In the present embodiment, the attenuator 66 is configured to accommodate the audio signals generally produced by the text-to-speech device 100 at the line level and the telephone 104 that is typically configured to receive signals from a microphone for processing at a preamp. Accordingly, a person of skill would recognize that directly supplying the audio signal from the text-to-speech device 100 at the line level to the input of the telephone 104 would overload the input circuitry. In other embodiments where the input of the telephone 104 is capable of receiving audio signals at the line level, the attenuator 66 can be omitted and the audio signal received at the connector 54 can be directly passed to the connector 58. In further embodiments still, the attenuator 66 can be substituted with an amplifier for embodiments where the input of the telephone 104 is configured to receive stronger audio signals.

Figure 3:
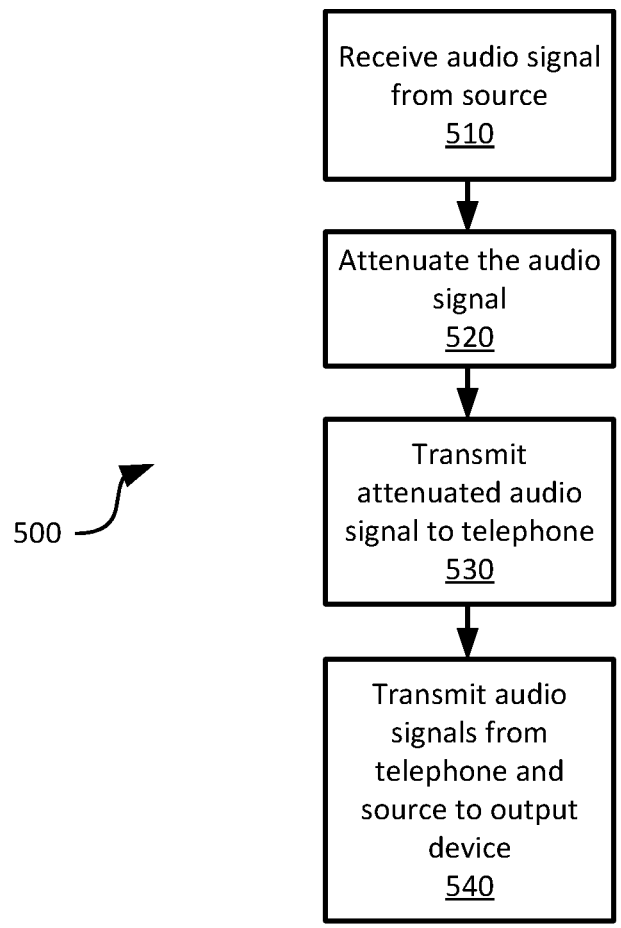
FIG. 3 is a flow chart of a method of communication in accordance with an embodiment.

Referring now to FIG. 3, a flowchart depicting a method of communicating with a remote party is indicated generally at 500. In order to assist in the explanation of the method, it will be assumed that method 500 is carried out using communication system 40 as shown in FIG. 1. Furthermore, the following discussion of method 500 will lead to further understanding of the audio adaptor 50 and its various components. For convenience, various process blocks of method 500 are indicated in FIG. 3 as occurring within or between certain components of the communication system 40. Such indications are not to be construed in a limiting sense. It is to be understood, however, that communication system 40 and/or method 500 can be varied, and need not work as discussed herein in conjunction with each other, and the blocks in method 500 need not be performed in the order as shown. For example, various blocks can be performed in parallel rather than in sequence. Such variations are within the scope of the present invention. Such variations also apply to other methods and system diagrams discussed herein.

Block 510 comprises receiving an audio signal from a source at the audio adaptor 50. In the present embodiment, the source is the text-to-speech device 100 and the audio signal received corresponds to the audio output generated by the text-to-speech device 100 upon entry of a text string by the person with a speech impairment. It is to be appreciated with the benefit of this description that the audio signal is not particularly limited and can include various types of signals capable of transmitting audio output. In the present embodiment, the audio signal is an analog signal at the line level received by the connector 54 as discussed above. In other embodiments, the audio signal can be transmitted at another level or can be modified to be a digital signal for processing by a digital signal processor.

Block 520 comprises attenuating the audio signal received at the connector 54. It is to be appreciated that the manner by which the audio signal is attenuated is not particularly limited and that variations are contemplated. For example, the attenuation can be carried out using a simple passive attenuator comprising a resistor. In the present embodiment, the audio signal is attenuated from the line level to the microphone level to be compatible with a microphone input of the telephone 104.

Block 530 comprises transmitting the attenuated audio signal generated at block 520 to the telephone 104 via the connector 58 for subsequent transmission to the remote party. It is to be appreciated that the manner by which the attenuated audio signal is transmitted is not particularly limited. In the present embodiment, the attenuated audio signal is transmitted at the microphone level to be compatible with the microphone input of the telephone 104. In other embodiments, the audio signal can be transmitted at another level or can be modified to be a digital signal.

Block 540 comprises transmitting the audio signals received from the text-to-speech device 100 and the telephone 104 at the connectors 54 and 58, respectively, to the audio output device 108. It is to be appreciated that the manner by which the audio signals are transmitted is not particularly limited. In the present embodiment, the audio signals are transmitted in separate channels at the line level to provide stereo output to the audio output device 108. It is to be appreciated by a person of skill in the art with the benefit of this description that by transmitting the audio signal from the text-to-speech device 100 and the telephone 104 to the audio output device 108, it can allow a person using the audio output device 108 to readily recognize what the text-to-speech device 100 is generating from what a remote party may be saying as received from the telephone 104. For example, the audio signal from the text-to-speech device 100 can be sent to the left channel of a pair of headphones while the audio signal from the telephone 104 can be sent to the right channel. In other embodiments, the audio signals can be transmitted at other levels, combined for transmission, or modified to be a digital signal.

It is to be re-emphasized that the method 500 described above is a non-limiting representation. For example, it is to be appreciated by a person of skill in the art that blocks 530 and 540 are generally carried out independently and can occur simultaneously or in reverse order. Furthermore, as discussed above, block 520 can be optional and omitted for embodiments where the audio signal does not necessarily need to be attenuated such as in embodiments of the communication system 40 where the telephone 104 can accept an audio signal at the line level or the text-to-speech device 100 is configured to generate output at the microphone level.

Figure 4:
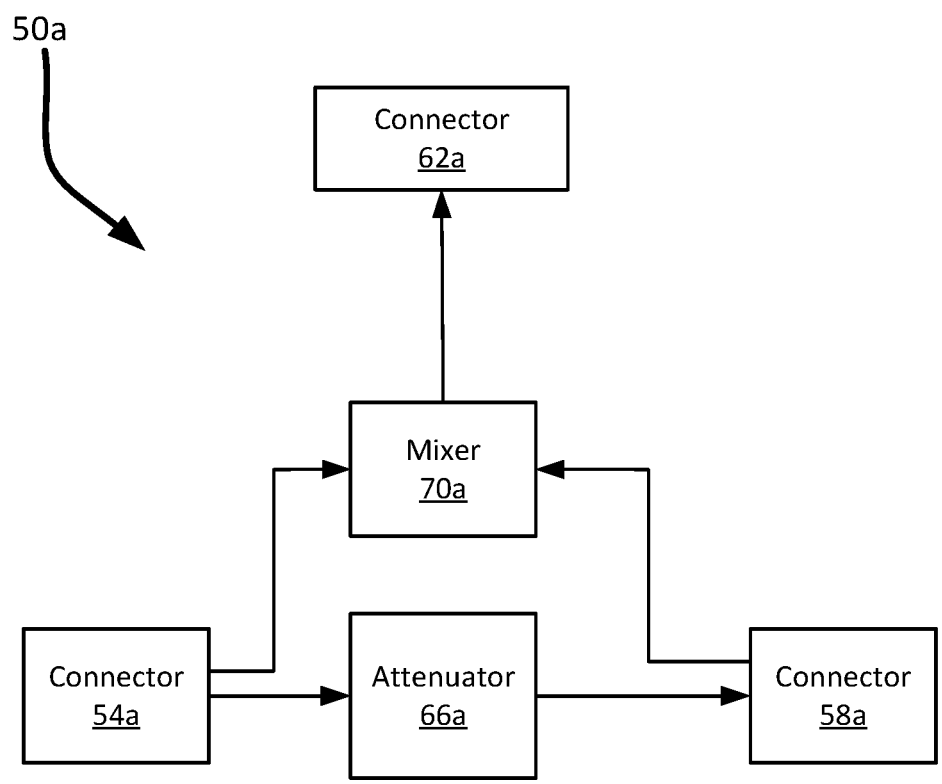
FIG. 4 is a schematic representation of an audio adaptor in accordance with another embodiment.

Referring to FIG. 4, another embodiment of an audio adaptor is indicated generally at 50a. Like components of the audio adaptor 50a bear like reference to their counterparts in the audio adaptor 50, except followed by the suffix "a". The audio adaptor 50a includes the plurality of connectors 54a, 58a, and 62a, and an attenuator 66a in connection with at least the connectors 54a and 58a.

In the present embodiment, the audio adaptor 50a further includes a mixer 70a in communication with the connectors 54a, 58a, and 62a. The mixer 70a is generally configured to combine the audio signals received from the text-to-speech device 100 via the connector 54a and the telephone 104 via the connector 58a. The combined audio signal subsequently outputted to via the connector 62a to the audio output device 108. It is to be appreciated by a person of skill having the benefit of this description that the manner by which the audio signals are combined is not particularly limited. For example, in the present embodiment a passive 4×1 kΩ mixer is used to combine the two audio signals into a single monophonic audio signal. It is to be appreciated by a person of skill in the art with the benefit of this description that any other type of mixer that can reliably combine the two audio signals into either a single monophonic signal or stereo signal of sufficient signal to noise ratio to maintain a conversation can be used.

Figure 5:
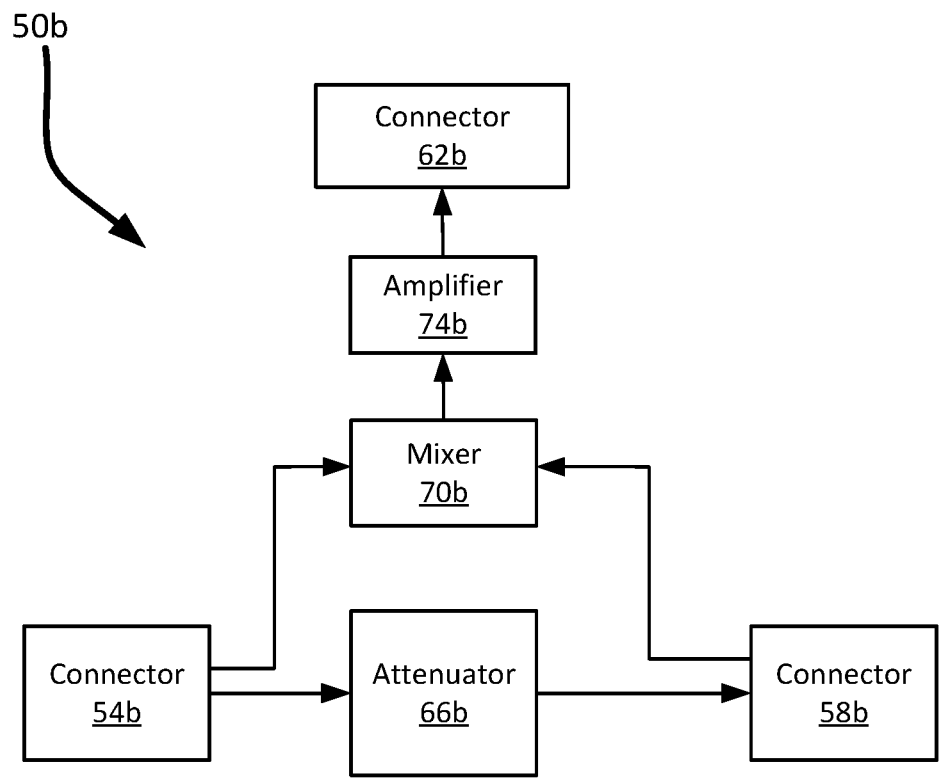
FIG. 5 is a schematic representation of an audio adaptor in accordance with another embodiment.

Referring to FIG. 5, another embodiment of an audio adaptor is indicated generally at 50b. Like components of the audio adaptor 50b bear like reference to their counterparts in the audio adaptor 50a, except followed by the suffix "b". The audio adaptor 50b includes the plurality of connectors 54b, 58b, and 62b, an attenuator 66b in connection with at least the connectors 54b and 58b, and a mixer 70b.

In the present embodiment, the audio adaptor 50b further includes an amplifier 74b for amplifying the combined signal from the mixer 70b before sending the audio signal to the connector 62b for output. It is to be appreciated by a person of skill having the benefit of this description that the manner by which the audio signal is amplified is not particularly limited. In the present example, the amplifier 74b can be a low power audio amplifier such as the LM386 from TEXAS INSTRUMENTS. It is to be appreciated by a person skilled in the art that other embodiments can use other amplifies such as amplifiers from ADVANCED ANALOG CIRCUITS (e.g. the AZ386), or those from STMICROELECTRONICS (e.g. the A21SP16).

Figure 6:
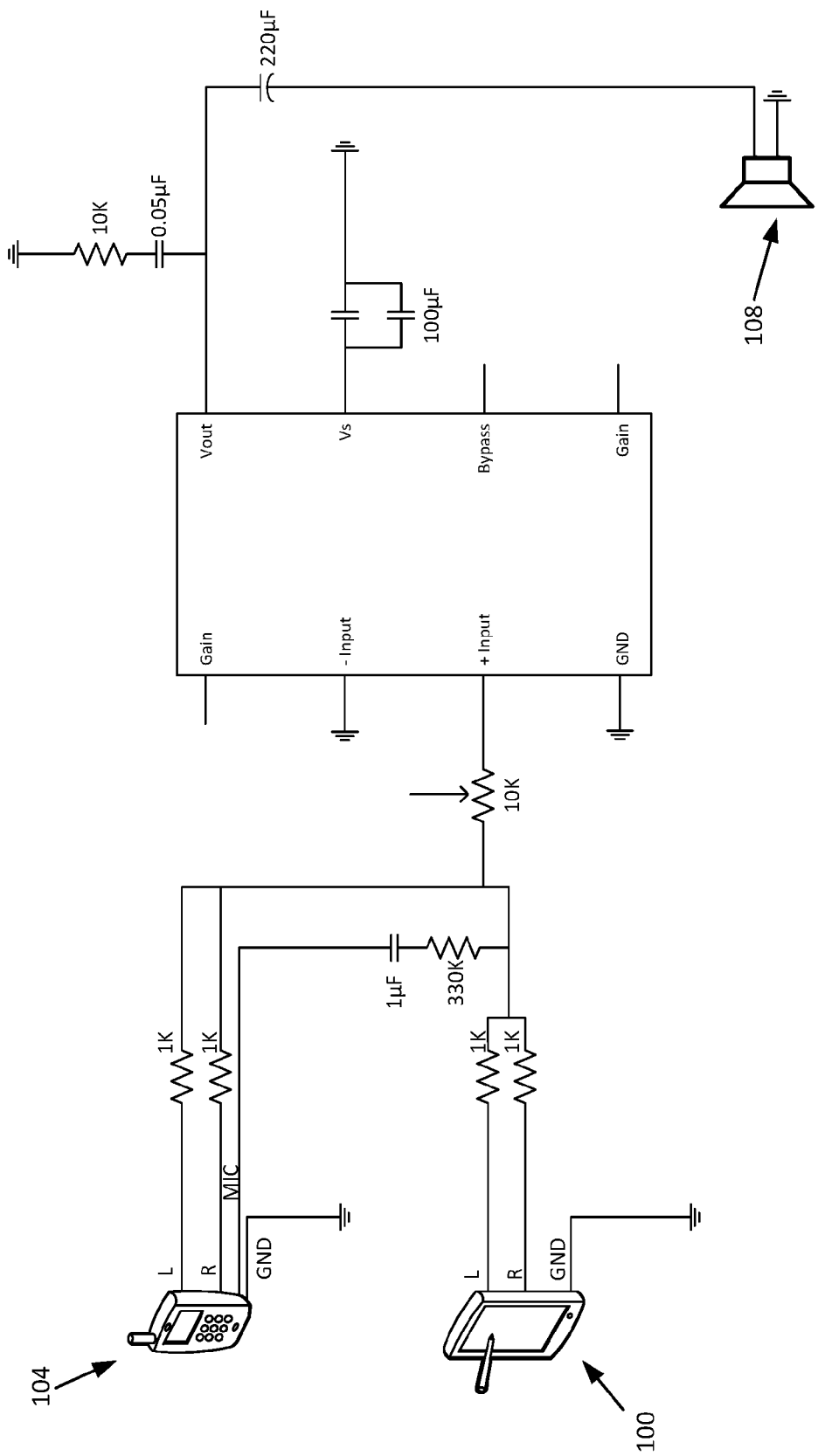
FIG. 6 is a circuit diagram of a communication system in accordance with an embodiment.

Referring to FIG. 6, a circuit diagram of a communication system for a person with a speech impairment using the audio adaptor 50b is generally shown. In the embodiment shown in FIG. 6, it is to be appreciated by a person of skill having the benefit of this description that this would be a simple design providing the functionality of establishing a voice communication with a remote party while allowing the person with a speech impairment to participate. In particular, the output generated at the audio output device 108 is monophonic and does not provide any additional amplification.

Figure 7:
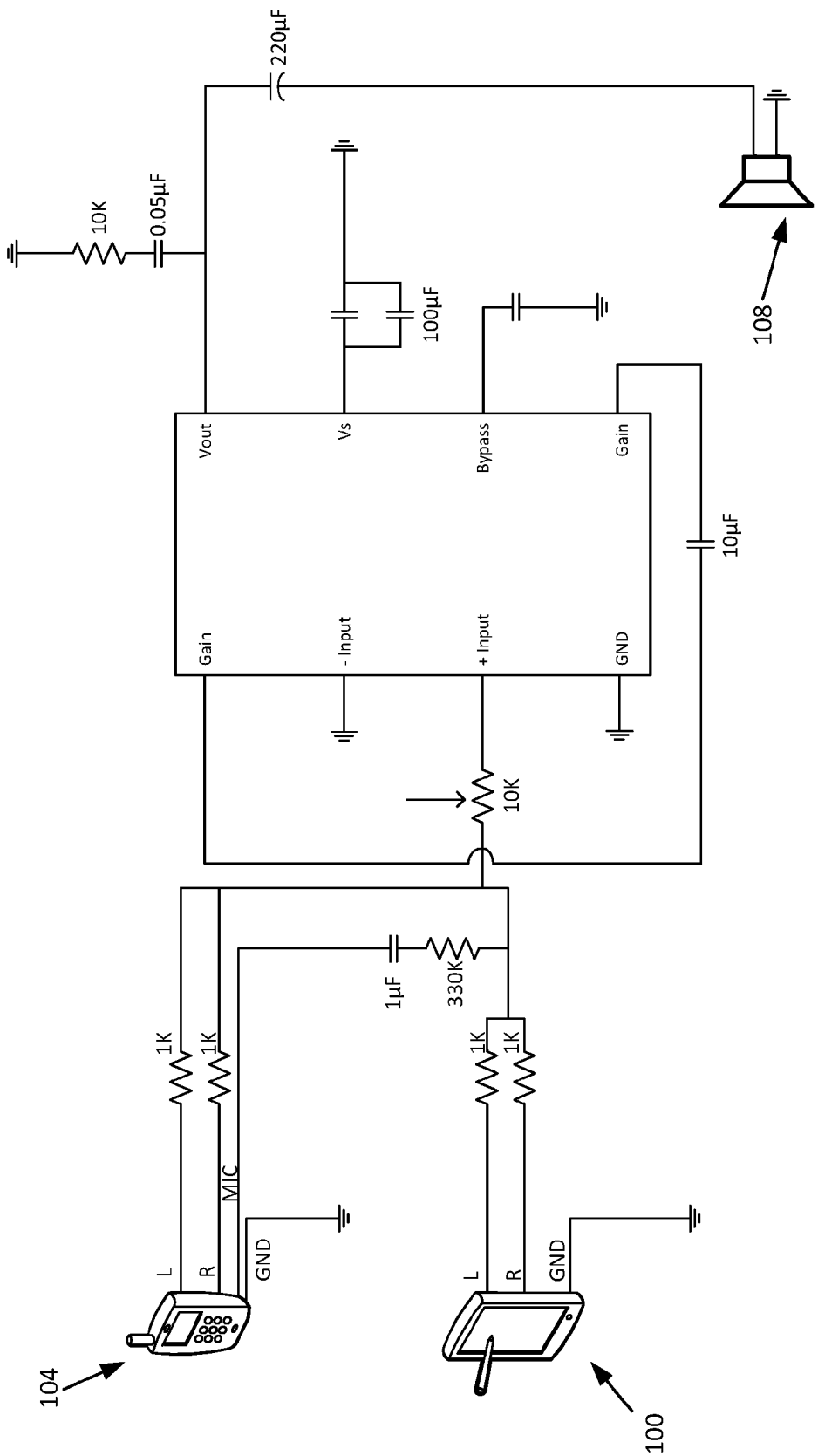
FIG. 7 is a circuit diagram of a communication system in accordance with another embodiment.

Referring to FIG. 7, a circuit diagram of a communication system for a person with a speech impairment using another implementation of the audio adaptor 50b is generally shown. In particular, it is to be appreciated by a person of skill with the benefit of this description that this implementation provides an amplification gain of about 200 to the audio signal received from the mixer 70b to the connector 62b.

Figure 8:
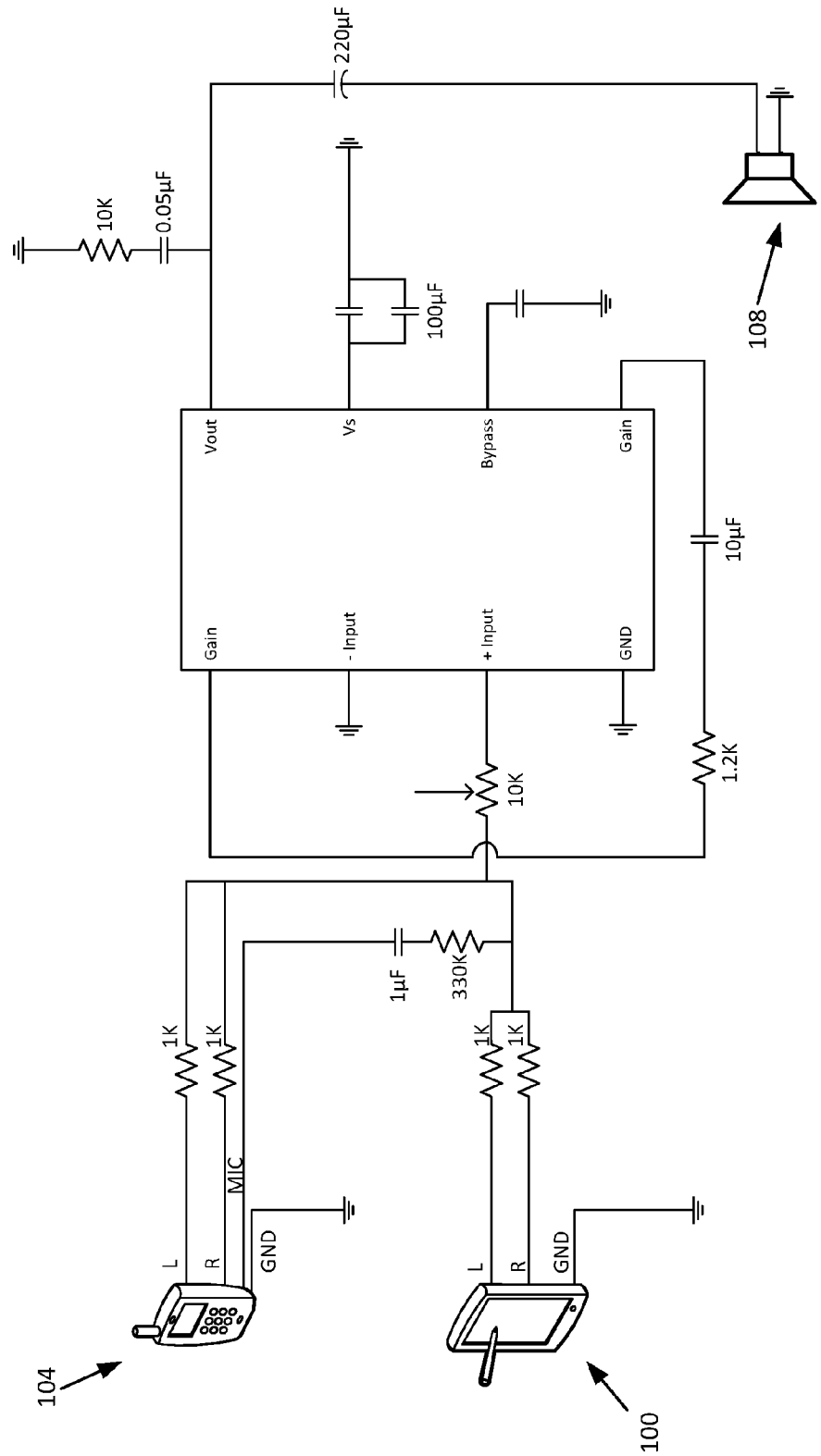
FIG. 8 is a circuit diagram of a communication system in accordance with an another embodiment.

Referring to FIG. 8, a circuit diagram of a communication system for a person with a speech impairment using another implementation of the audio adaptor 50b is generally shown. In particular, it is to be appreciated by a person of skill with the benefit of this description that this implementation provides an amplification gain of about 50 to the audio signal from the mixer 70b to the connector 62b.

Figure 9:
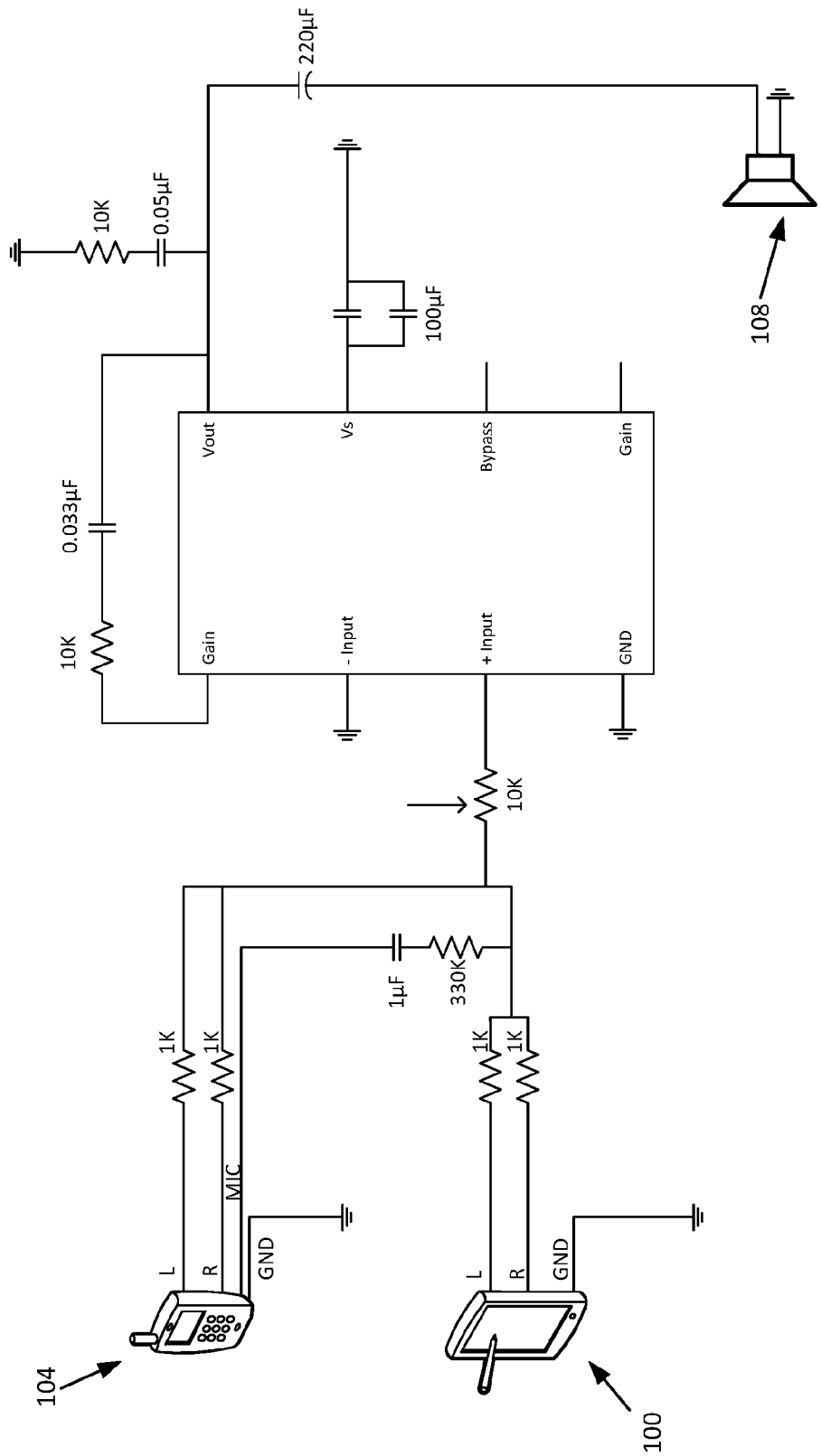
FIG. 9 is a circuit diagram of a communication system in accordance with an another embodiment.

Referring to FIG. 9, a circuit diagram of a communication system for a person with a speech impairment using another implementation of the audio adaptor 50b is generally shown. In particular, it is to be appreciated by a person of skill with the benefit of this description that this implementation provides a bass boost to the audio signal from the mixer 70b to the connector 62b for improved sound quality at the audio output device 108 at lower frequencies. It is to be appreciated by a person of skill in the art with the benefit of this description that bass boost can be adjustable in some embodiments to allow for manual or automatic adjustment of the sound quality based on the audio signal.

Figure 10:
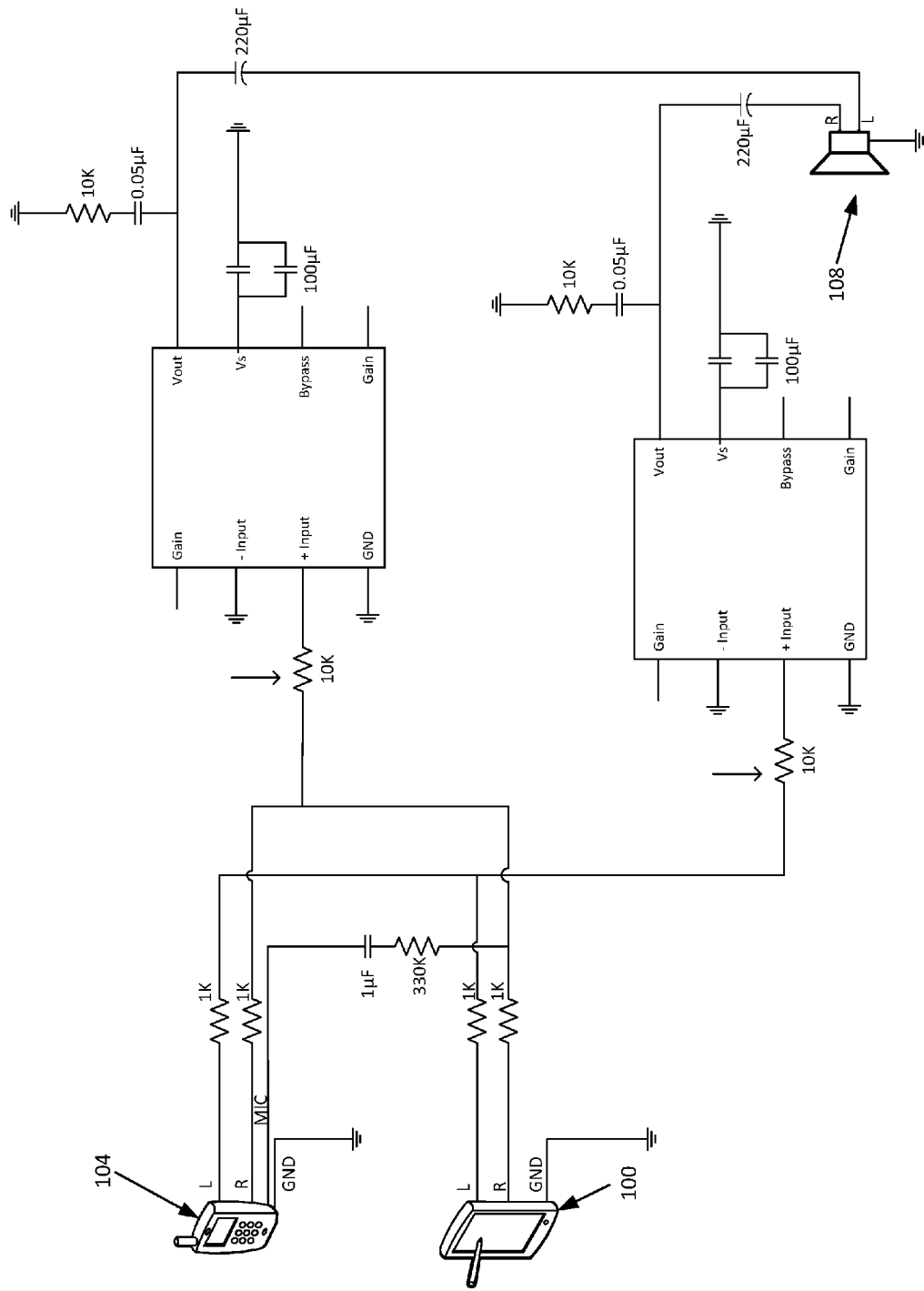
FIG. 10 is a circuit diagram of a communication system in accordance with an another embodiment.

Referring to FIG. 10, a circuit diagram of a communication system for a person with a speech impairment in accordance with another embodiment is generally shown. It is to be appreciated that in the present embodiment, a variation of the audio adaptor 50b is used that can provide stereophonic sound received from each of the text-to-speech device 100 and the telephone 104 and provided to the audio output device 108.

Figure 11:
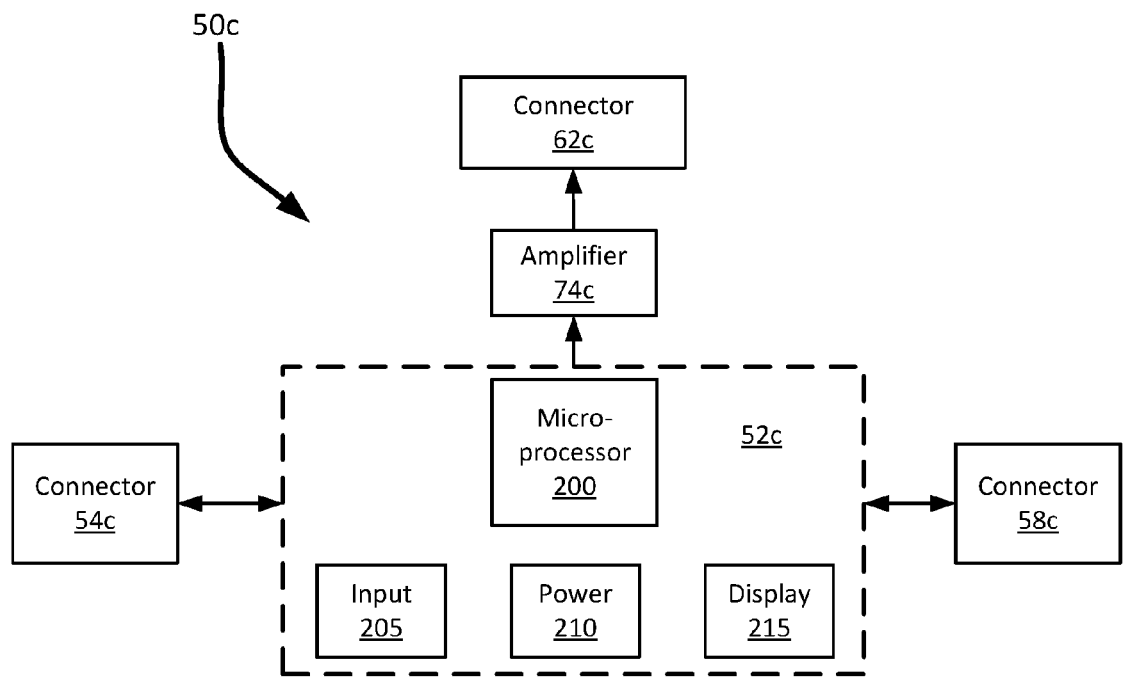
FIG. 11 is a schematic representation of an audio adaptor in accordance with another embodiment.

Referring to FIG. 11, another embodiment of an audio adaptor is indicated generally at 50c. Like components of the audio adaptor 50c bear like reference to their counterparts in the audio adaptor 50b, except followed by the suffix "c". The audio adaptor 50c includes the plurality of connectors 54c, 58c, and 62c, and an amplifier 74c.

In the present embodiment, the audio adaptor 50c includes a microcontroller 52c for controlling the signals to and from the plurality of connectors 54c, 58c, and 62c. In the present embodiment, the microcontroller 52c is a PIC18F46K80; however, it is to be appreciated that in other embodiments, other types of microcontrollers can be used. The microcontroller 52c includes a microprocessor 200, an input 205c, a power source 210 and a display 215.

The microprocessor 200 is not particularly limited and is generally configured to carry out instructions for receiving an audio signal via the connector 54c and re-generating output at the connectors 58c and 62c for subsequent transmission to external devices such as a telephone and/or an audio output device. It is to be appreciated by a person of skill in the art with the benefit of this description that the microprocessor 200 can also act as a mixer to combine one or more outputs digitally for output via the connector 62c or any other connector. In the present embodiment, the microprocessor 200 is configured to process a digital audio signal received from an analog to digital converter (not shown). The microprocessor 200 is also configured to receive input data from the input 205 to control signal processing. For example, the microprocessor can control the volume of the re-generated output signals at the connectors 58c and 62c digitally. In the present embodiment, the volume control is a digital, logarithmic potentiometer allowing volume increase or decrease with push button control (not shown) from the input 205. The push buttons are used to increase or decrease the amplitude of the signal received at the connector 54c before being processed by the microprocessor 200.

The input 205 is generally configured to provide input data the to the microprocessor 200. The input data received via the input 205 is not particularly limited and can include data for controlling the operation of the microcontroller 52c, such as a command to increase or decrease volume at one or both of the connectors 58c and 62c. The input 205 can also be a communications port for receiving instructions to control the microprocessor.

The power source 210 is generally configured to power the microcontroller 52c. The power source 210 is not particularly limited and can include a battery, such as a lithium ion battery, or a disposable battery for improved portability of the audio adapter 50c. In some embodiments, the power source 210 can be a connector configured to receive an AC or DC current.

The display 215 is generally configured to provide output a user to indicate a status of the audio adapter 50c. For example, the display 215 can include an LCD screen or an indicator LED. The display 215 can be used to indicate whether the audio adaptor 50c is powered on, or low on battery. In addition, the display 215 can also be used to indicate a volume level.

It is to be re-emphasized that the structures described herein are a non-limiting representation only. In particular, it is to be understood that various features of the embodiments described herein can be combined or modified. For example, it is to be appreciated by a person of skill in the art with the benefit of this description various modifications to the audio signals received from the text-to-speech device 100 and the telephone 104 can be carried out. For example, FIG. 9 provided a bass boost, but other modifications and filters can be used to improve sound quality such as reducing ambient background noise or matching the volumes of the text-to-speech device 100 and the telephone 104 when one is louder than the other.

As another example of a variation, it is to be appreciated that the audio adaptor 50 can be directly built into one of the text-to-speech device 100, the telephone 104, or the audio output device 108 or sold as an additional add-on component or aftermarket part. In such a variation, it may be possible to omit one or more of the connectors 54, 58, or 62, if the audio adaptor 50 were to be designed on the same circuitry controlling one of the text-to-speech device 100, the telephone 104, or the audio output device 108.

As another example of a variation, it is to be appreciated that although the embodiments shown above use analog connections between the text-to-speech device 100, the telephone 104, and the audio output device 108, it is contemplated that the audio adaptor can be modified to accommodate wireless connections, such as BLUETOOTH, between one or more of the text-to-speech device 100, the telephone 104, or the audio output device 108.

Various advantages will now be apparent to a person of skill in the art. Of note is the ability for a person with a speech impairment to engage in a voice communication with a remote party while being able to listen to and monitor the audio output from a text-to-speech device 100 operated by the person while also listening to the audio from the remote party. Furthermore, the audio adaptor 50 allows for the use of personal headphones or earbuds so that a conversation can be carried on in relative privacy, even in a public place.

While specific embodiments have been described and illustrated, such embodiments should be considered illustrative only and should not serve to limit the accompanying claims.

What is claimed is:

1. An audio adaptor comprising:
a first connector for connecting to a source of audio, the first connector configured to receive a first audio signal at a line level from the source of audio;
a second connector for connecting to a telephone, the second connector configured to receive, from the telephone, a second audio signal at the line level from the telephone and to transmit, to the telephone, the first audio signal at a microphone level;
a third connector for connecting to an audio output device, the third connector configured to transmit the first audio signal and the second audio signal at the line level to the audio output device; and
a microcontroller connected to the first connector and the second connector, the microcontroller for transmitting the first audio signal via the second connector at the microphone level.

2. The audio adaptor of claim 1, wherein the microcontroller comprises a microprocessor to re-generate the first audio signal at a reduced voltage.

3. The audio adaptor of claim 2, wherein the microprocessor combines the first audio signal received from the first connector and the second audio signal received from the second connector to generate a combined audio signal for output to the third connector.

4. The audio adaptor of claim 3, further comprising an amplifier configured to amplify the combined audio signal.

5. The audio adaptor of claim 1, wherein the third connector is configured to connect to headphones.

6. The audio adaptor of claim 5, wherein the third connector is configured to provide stereo output to the headphones.

7. The audio adaptor of claim 6, wherein a first channel of the stereo output is configured to output the first audio signal and a second channel of the stereo output is configured to output the second audio signal.

8. The audio adaptor of claim 1, wherein the second connector is a four-conductor connector.

9. The audio adaptor of claim 1, wherein the first connector is configured to connect to a text-to-speech device.

10. The audio adaptor of claim 9, wherein the text-to-speech device is a tablet computer.

11. The audio adaptor of claim 1, further comprising a digital-signal processor for receiving a digital signal from the first connector.

12. A method of communication, the method comprising:
receiving a first audio signal at a line level from a source of audio via a first connector connected to the source of audio;
receiving a second audio signal at the line level from a telephone via a second connector connected to the telephone;
transmitting the first audio signal and the second audio signal at the line level to an audio output device via a third connector;
re-generating the first audio signal at a microphone level using a microprocessor connected to the first connector and the second connector; and
transmitting the first audio signal at the microphone level to the telephone.

13. The method of claim 12, wherein re-generating comprises re-generating the first audio signal at a reduced voltage of the first audio signal.

14. The method of claim 12, further comprising combining the first audio signal received from the first connector and the second audio signal received from the second connector to generate a combined audio signal for output to the third connector.

15. The method of claim 14, further comprising amplifying the combined audio signal.

16. The method of claim 12, further comprising connecting the third connector to headphones.

17. The method of claim 16, further comprising providing stereo output to the headphones.

18. The method of claim 17, wherein transmitting the first audio signal and the second audio signal comprises outputting the first audio signal to a first channel of the stereo output and outputting the second audio signal to a second channel of the stereo output.

19. The method of claim 12, further comprising connecting the first connector to a text-to-speech device.

20. The method of claim 12, wherein receiving the first audio signal comprises receiving a digital signal.

* * * * *